(12) United States Patent
Hoelle et al.

(10) Patent No.: US 6,786,183 B2
(45) Date of Patent: Sep. 7, 2004

(54) COOLANT CIRCUIT FOR AN INTERNAL COMBUSTION ENGINE AND METHOD OF MAKING AND USING SAME

(75) Inventors: Michael Hoelle, Vaihingen/Enz (DE); Roland Kemmler, Stuttgart (DE); Erhard Rau, Weilheim (DE); Hubert Schnuepke, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/290,452

(22) Filed: Nov. 8, 2002

(65) Prior Publication Data

US 2003/0094147 A1 May 22, 2003

(30) Foreign Application Priority Data

Nov. 8, 2001 (DE) .......................................... 101 54 926

(51) Int. Cl.[7] .................................................. F01P 5/10
(52) U.S. Cl. .................................................. 123/41.44
(58) Field of Search .................... 123/41.44, 41.47, 123/41.15, 41.02, 198 D

(56) References Cited

U.S. PATENT DOCUMENTS

| | | | | |
|---|---|---|---|---|
| 3,999,598 A | * | 12/1976 | Fehr et al. ................ | 123/41.44 |
| 4,387,670 A | * | 6/1983 | Robin et al. .............. | 123/41.15 |
| 4,431,372 A | * | 2/1984 | Dadhich ..................... | 415/175 |
| 4,759,316 A | * | 7/1988 | Itakura ...................... | 123/41.44 |
| 5,036,803 A | * | 8/1991 | Nolting et al. ............ | 123/41.44 |
| 5,215,044 A | | 6/1993 | Banzhaf et al. ........... | 123/41.29 |
| 6,216,645 B1 | * | 4/2001 | Bobretzky et al. ....... | 123/41.15 |
| 6,230,668 B1 | * | 5/2001 | Marsh et al. .............. | 123/41.44 |
| 6,349,692 B1 | * | 2/2002 | Reinosa .................... | 123/196 S |
| 6,523,519 B2 | * | 2/2003 | Iwano et al. .............. | 123/196 R |
| 6,527,074 B1 | * | 3/2003 | Morishita .................. | 180/65.1 |

FOREIGN PATENT DOCUMENTS

| | | |
|---|---|---|
| DE | 40 32 701 A1 | 6/1992 |
| DE | 43 42 293 A1 | 6/1995 |
| DE | 195 06 932 | 4/1996 |

* cited by examiner

Primary Examiner—Henry C. Yuen
Assistant Examiner—Jason Benton
(74) Attorney, Agent, or Firm—Crowell & Moring LLP

(57) ABSTRACT

A coolant circuit is provided for an internal combustion engine, with a coolant radiator, at least one mechanical coolant pump and at least one electrical coolant pump for a cooling circuit having a coolant inflow and for a heating circuit having a coolant return, in each case with at least one heat exchanger, the mechanical coolant pump and/or the electrical coolant pump being assigned to the heating and/or cooling circuit, and the mechanical pump being capable of being cut in and cut out or of being throttled.

25 Claims, 1 Drawing Sheet

US 6,786,183 B2

COOLANT CIRCUIT FOR AN INTERNAL COMBUSTION ENGINE AND METHOD OF MAKING AND USING SAME

BACKGROUND AND SUMMARY OF THE INVENTION

This application claims the priority of German Patent Document 101 54 926.1, filed on Nov. 8, 2001, the disclosure of which is expressly incorporated by reference herein.

The invention relates to a coolant circuit for an internal combustion engine, with a coolant radiator, at least one mechanical coolant pump and at least one electrical coolant pump for a cooling circuit having a coolant inflow and for a heating circuit having a coolant return, in each case with at least one heat exchanger, the mechanical coolant pump and/or the electrical coolant pump being assigned to the heating and/or cooling circuit, and the mechanical pump being capable of being cut in and cut out or of being throttled.

A coolant circuit for an internal combustion engine of motor vehicles is already known from DE 195 06 935 C1, which has a heating circuit independent of the engine cooling circuit and provided with an electrical pump device. The pump device is capable of being cut in and out in a rotational-speed-regulated and/or timed manner by an electronic control or regulating device for controlling or regulating the heating capacity of the heating circuit. In this case, a coolant inflow and a return of the heating circuit are integrated in a common connection piece arranged directly on an engine block of the internal combustion engine.

An aspect on which certain preferred embodiments of the invention are based is to design and arrange a coolant circuit in such a way as to ensure optimum heat utilization in conjunction with a fuel saving.

This aspect is achieved in that the mechanical coolant pump and/or electrical coolant pump is assigned to the heating and/or cooling circuit and/or the mechanical pump is capable of being cut in and cut out, thereby achieving that the electrical coolant pump can be used alternatively or additionally, depending on the rotational speed of the engine or of the mechanical coolant pump and according to the demand for waste heat within the cooling circuit or the heating circuit. It is also possible for the electrical coolant pump, as an alternative to the mechanical coolant pump, to ensure both the cooling circuit and the heating circuit. This ensures optimum heating of the internal combustion engine, a supply of heat to the passenger cell which is independent of the engine rotational speed, and also an associated fuel saving.

For this purpose, it is advantageous that the coolant return of the heating circuit is throughflow-connected to the coolant inflow of the cooling circuit and the coolant circuit can be separated from the coolant radiator, or a coolant shunt circuit separate from the coolant radiator is provided between the internal combustion engine, the cooling circuit and/or the heating circuit. The two coolant streams can thus be brought together, it being possible to discharge the waste heat from the cooling circuit to the heating circuit when the coolant radiator is separated from the coolant circuit.

Furthermore, it is advantageous that the cooling circuit is throughflow-connected to the heat exchanger, designed as an oil cooler, to the internal combustion engine and/or to the heating circuit, and the heating circuit is throughflow-connected to the heating heat exchanger, to the internal combustion engine and/or to the cooling circuit. This allows the greatest possible heat compensation between the cooling circuit and the heating circuit.

It is also advantageous, for this purpose, that a throttle circuit, separate from the coolant circuit or from the coolant shunt circuit, is provided between the electrical or the mechanical coolant pump, the internal combustion engine and a controllable or regulatable throttle. Where high throttling resistance is concerned, the cooling circuit may also be ensured via the electrical coolant pump and, where a low throttling resistance is concerned, the heating circuit can also be ensured via the electrical coolant pump. Both coolant circuits are thus operatively connected to both coolant pumps.

Finally, according to a preferred embodiment, it is provided that the cooling circuit of the internal combustion engine is throughflow-connected to the coolant radiator, designed as an air radiator, and/or to the heating circuit via the mechanical coolant pump and/or the electrical coolant pump, and that the mechanical coolant pump, the electrical coolant pump, the air radiator, the heating heat exchanger and/or the oil cooler are capable of being cut into and cut out from the coolant circuit or of being throttled via a valve.

With regard to the design and arrangement, it is advantageous that the valve has at least one coolant inflow and at least one coolant outflow capable of being cut in and out or of being throttled, and the valve is assigned a temperature-dependent and/or regulatable control member, such as a thermostat and/or a controller.

It is advantageous, furthermore, that the internal combustion engine has at least one coolant inflow throughflow-connected to the mechanical coolant pump and at least one coolant inflow throughflow-connected to the electrical coolant pump and at least one coolant return throughflow-connected to the throttle, to the second heat exchanger of the heating circuit and to the first heat exchanger of the cooling circuit.

It is advantageous, moreover, that the throttle is assigned an actuating and/or regulating member, at least one coolant outflow of the oil cooler, at least one coolant outflow of the heating heat exchanger, at least one coolant outflow of the internal combustion engine and/or at least one coolant outlet of the air radiator having a temperature sensor.

The functional features of the valves, their arrangement and the use of the temperature sensors ensure that a control and regulating device is employed for the optimum utilization of the existing and useful heat quantities.

DETAILED DESCRIPTION OF THE DRAWING

Figure 1:
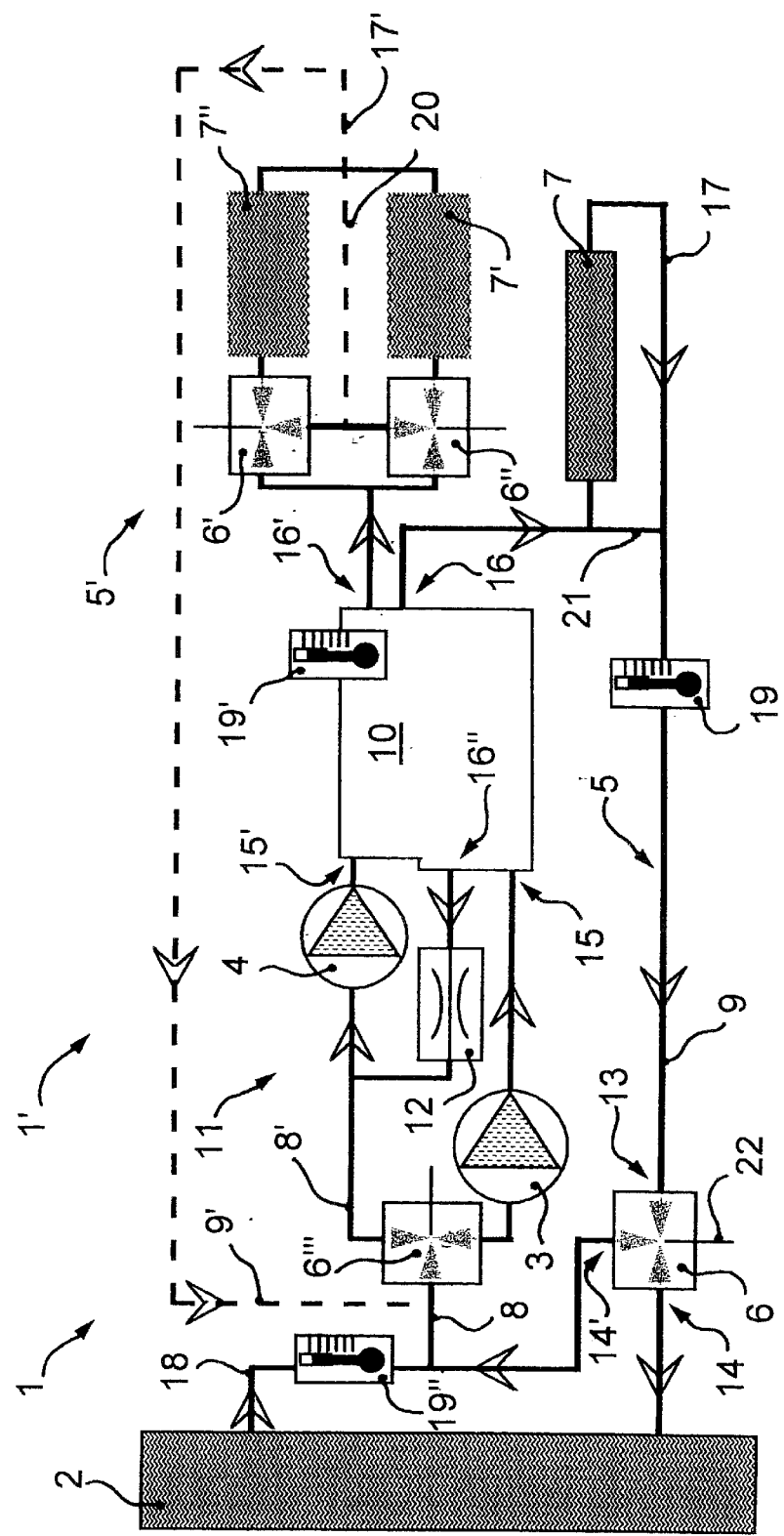
FIG. 1 shows a coolant circuit which has a cooling circuit and a heating circuit.

As shown in FIG. 1, a coolant circuit 1 has a cooling circuit 5 and a heating circuit 5'. The heating circuit 5', illustrated essentially by broken lines, is in this case formed by an internal combustion engine 10 or its coolant outflow 16', two valves 6', 6", two heating heat exchangers 7', 7", a valve 6''', at least one electrically driven coolant pump 4 or one mechanically driven coolant pump 3 and at least one coolant inflow 15, 15'.

The coolant stream from the coolant outflow 16' of the internal combustion engine 10 is allocated to the two parallel-connected heating heat exchangers 7', 7" which are capable of being cut in and out, in each case separately from one another, via the two valves 6', 6". The heating heat exchangers 7', 7" are designed as available-heat exchangers or air heaters and serve for heating the passenger cell.

In addition to the two heating heat exchangers 7', 7", a bypass 20 for the two heating heat exchangers 7', 7" is provided, which, with the valves 6', 6" being in an appropriate position or with the heating heat exchangers 7', 7" throttled or cut out, transfers the coolant stream which occurs. The bypass 20 adjoins a connecting line of the two valves 6', 6" and connects these to a coolant outflow 17' of the two heating heat exchangers 7', 7". The two heating heat exchangers 7', 7" can be regulated, controlled or throttled separately via their respective valve 6, 6'. The coolant passes via a coolant return 9' of the heating circuit 5' from the two heating heat exchangers 7', 7" or the bypass 20 into the coolant return 9' of the heating circuit 5' and consequently into the coolant inflow of the mechanical coolant pump 3 and of the electrical coolant pump 4, from where it is subsequently fed to the internal combustion engine 10 via a coolant inflow 15, 15'.

The cooling circuit 5 is formed by the internal combustion engine 10 or its coolant outflow 16', an oil cooler 7, two valves 6, 6''', the mechanically driven coolant pump 3 and/or the electrical coolant pump 4 and the coolant inflow 15, 15'. In this case, the coolant stream from a coolant outflow 16 of the internal combustion engine 10 is allocated to the oil cooler 7 and a parallel-connected bypass 21, the bypass 21 connecting the coolant outflow 16 directly to a coolant return 9 of the cooling circuit 5. Via the coolant return 9 connected to the oil cooler 7 or to the bypass 21, the coolant passes into a coolant inflow 13 of the valve 6. Via a coolant inflow 13 of the valve 6, the coolant stream which occurs is transferred, via a coolant outflow 14' of the valve 6, into the coolant inflow 8 of the mechanical coolant pump 3 and of the electrical coolant pump 4, and/or, via a coolant outflow 14 of the valve 6, into a coolant radiator 2 designed as an air radiator. The air radiator 2 is thus capable of being cut in, cut out and throttled.

With the air radiator 2 cut out, the coolant circuit 1 is reduced to a coolant shunt circuit 1'. In this case, the coolant stream is fed directly to the coolant inflow 8 of the valve 6''' of the two coolant pumps 3, 4 via the valve 6. The air radiator 2 likewise has a coolant inflow, as well as a coolant outlet 18 which is throughflow-connected directly to the coolant inflow 8 of the mechanical coolant pump 3 and of the electrical coolant pump 4.

From the coolant inflow 8 or the coolant return 9', the coolant stream is allocated via a further valve 6''' to the mechanical coolant pump 3 and the electrical coolant pump 4 and finally arrives at a coolant inflow 8' of the coolant circuit 5' and at a coolant inflow 15 of the cooling circuit 5 of the internal combustion engine 10.

The electrical coolant pump 4 forms a throttle circuit 11 with a throttle 12 and the internal combustion engine 10. For this purpose, the internal combustion engine 10 has a further coolant outflow 16", which leads directly into the throttle 12. Downstream of the throttle 12, the coolant stream is delivered to the coolant inflow 8' or the electrical coolant pump 4. The throttle 12 or the throttling resistance can be regulated via an actuating member which is not illustrated. Thus, with the throttle 12 closed or with a high throttling resistance and with the mechanical coolant pump 3 cut out or separated, the cooling circuit 5 can be ensured by the electrical coolant pump 4. In contrast to this, with the throttle 12 open or with a low throttling resistance and with the electrical coolant pump 4 cut out or separated, a coolant stream can be supplied to the heating heat exchanger 7', 7" of the heating circuit 5' via the coolant outflow 16", the coolant inflow 15' of the internal combustion engine 10 and, finally, the coolant outflow 16'.

The valves 6 are designed as three-way valves with an actuating member 22, illustrated in an idealized manner. They each have a coolant inflow 13 and two coolant outflows 14, 14' which are in each case capable of being continuously cut in and cut out or closed.

The coolant outlet 18 of the air radiator 2, the coolant return 9 of the cooling circuit 5, and the internal combustion engine 10 each have a temperature sensor 19, 19', 19", the said temperature sensors being operatively connected to the control and regulating device, not illustrated, of the coolant circuit 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Coolant circuit for an internal combustion engine, comprising:
    a radiator, and a cooling circuit having a coolant inflow and a heat exchanger, and
    a heating circuit having a coolant return and a heating heat exchanger,
    wherein the cooling and heating circuits together include at least one mechanically driven coolant pump and at least one electrically driven coolant pump,
    wherein the mechanical pump can be cut in, cut out, or throttled, and
    wherein the internal combustion engine has at least one coolant inflow throughflow-connected to the mechanical coolant pump and to the electrical coolant pump and at least one coolant outflow throughflow-connected to a throttle, the heating heat exchanger of the heating circuit, and the heat exchanger of the cooling circuit.

2. Coolant circuit according to claim 1, wherein the coolant return of the heating circuit is throughflow-connected to the coolant inflow of the cooling circuit.

3. Coolant circuit according to claim 1, wherein the coolant circuit can be separated from the radiator, and wherein the radiator is a coolant radiator designed as an air cooler.

4. Coolant circuit according to claim 1, wherein a coolant shunt circuit separate from the radiator is provided between the internal combustion engine and the cooling circuit or the heating circuit.

5. Coolant circuit according to claim 2, wherein a coolant shunt circuit separate from the radiator is provided between the internal combustion engine and the cooling circuit or the heating circuit.

6. Coolant circuit according to claim 1,
    wherein the heat exchanger of the cooling circuit is an oil cooler, and the cooling circuit is throughflow-connected to at least one of the oil cooler, the internal combustion engine, and the heating circuit, and
    wherein the heating circuit is throughflow-connected to at least one of the heating heat exchanger, the internal combustion engine, and the cooling circuit.

7. Coolant circuit according to claim 2,
    wherein the heat exchanger of the cooling circuit is an oil cooler, and the cooling circuit is throughflow-connected to at least one of the oil cooler, the internal combustion engine, and the heating circuit, and wherein the heating circuit is throughflow-connected to at least one of the heating heat exchanger, the internal combustion engine, and the cooling circuit.

8. Coolant circuit according to claim 3, wherein the heat exchanger of the cooling circuit is an oil cooler, and the cooling circuit is throughflow-connected to at least one of the oil cooler, the internal combustion engine, and the heating circuit, and wherein the heating circuit is throughflow-connected to at least one of the heating heat exchanger, the internal combustion engine, and the cooling circuit.

9. Coolant circuit according to claim 4, wherein the heat exchanger of the cooling circuit is an oil cooler, and the cooling circuit is throughflow-connected to at least one of the oil cooler, the internal combustion engine, and the heating circuit, and wherein the heating circuit is throughflow-connected to at least one of the heating heat exchanger, the internal combustion engine, and the cooling circuit.

10. Coolant circuit according to claim 1, wherein a throttle circuit is formed by the internal combustion engines, an actuatable or regulatable throttle, and at least one of the electrically driven coolant pump and the mechanically driven coolant pump.

11. Coolant circuit according to claim 2, wherein a throttle circuit is formed by the internal combustion engines, an actuatable or regulatable throttle, and at least one of the electrically driven coolant pump and the mechanically driven coolant pump.

12. Coolant circuit according to claim 4, wherein a throttle circuit is formed by the internal combustion engine, an actuatable or regulatable throttle, and at least one of the electrically driven coolant pump and the mechanically driven coolant pump.

13. Coolant circuit according to claim 6, wherein a throttle circuit is formed by the internal combustion engine, an actuatable or regulatable throttle, and at least one of the electrically driven coolant pump and the mechanically driven coolant pump.

14. Coolant circuit according to claim 1, wherein the cooling circuit of the internal combustion engine is throughflow-connected to at least one of the radiator and to the heating circuit via at least one of the mechanically driven coolant pump and the electrically driven coolant pump.

15. Coolant circuit according to claim 2, wherein the cooling circuit of the internal combustion engine is throughflow-connected to at least one of the radiator and to the heating circuit via at least one of the mechanically driven coolant pump and the electrically driven coolant pump.

16. Coolant circuit according to claim 3, wherein the cooling circuit of the internal combustion engine is throughflow-connected to at least one of the radiator and to the heating circuit via at least one of the mechanically driven coolant pump and the electrically driven coolant pump.

17. Coolant circuit according to claim 6, wherein the cooling circuit of the internal combustion engine is throughflow-connected to at least one of the radiator and to the heating circuit via at least one of the mechanically driven coolant pump and the electrically driven coolant pump.

18. Coolant circuit according to claim 10, wherein the cooling circuit of the internal combustion engine is throughflow-connected to at least one of the radiator and to the heating circuit via at least one of the mechanically driven coolant pump and the electrically driven coolant pump.

19. Coolant circuit according to claim 1, wherein at least one of the mechanically driven coolant pump, the electrically driven coolant pump, the radiator, and the heating heat exchanger is capable of being cut into and cut out from the coolant circuit or of being throttled via a valve.

20. Coolant circuit according to claim 2, wherein at least one of the mechanically driven coolant pump, the electrically driven coolant pump, the radiator, and the heating heat exchanger is capable of being cut into and cut out from the coolant circuit or of being throttled via a valve.

21. Coolant circuit according to claim 14, wherein at least one of the mechanically driven coolant pump, the electrically driven coolant pump, the radiator, and the heating heat exchanger is capable of being cut into and cut out from the coolant circuit or of being throttled via a valve.

22. Coolant circuit according to claim 19, wherein the valve is integrated into at least one coolant inflow and at least one coolant outflow capable of being cut in, cut out, or throttled, and wherein a temperature-dependent or regulatable control member is assigned to the valve.

23. Coolant circuit according to claim 10, wherein the throttle is assigned an actuating or regulating member, and wherein at least one of a coolant outflow of the oil cooler, a coolant outflow of the heating heat exchanger, a coolant outflow of the internal combustion engine, and a coolant outlet of the coolant radiator having a temperature sensor.

24. A method of making a coolant circuit for an engine comprising making the coolant circuit of claim 1.

25. A method of using a coolant circuit for an engine comprising utilizing the coolant circuit of claim 1.

* * * * *